(12) United States Patent
Gorney et al.

(10) Patent No.: US 12,397,775 B2
(45) Date of Patent: Aug. 26, 2025

(54) METHOD FOR CONTROLLING VEHICLE POWERTRAIN BASED ON OBSTACLE DETECTION

(71) Applicant: FCA US LLC, Auburn Hills, MI (US)

(72) Inventors: Anthony N Gorney, Oxford, MI (US); Stephanie Beck, Pinckney, MI (US); Scott E Henson, Chelsea, MI (US); Roger C Sager, Munith, MI (US)

(73) Assignee: FCA US LLC, Auburn Hills, MI (US)

( * ) Notice: Subject to any disclaimer, the term of this patent is extended or adjusted under 35 U.S.C. 154(b) by 192 days.

(21) Appl. No.: 18/459,502

(22) Filed: Sep. 1, 2023

(65) Prior Publication Data

US 2025/0074393 A1    Mar. 6, 2025

(51) Int. Cl.
*B60W 20/15* (2016.01)
*B60W 10/06* (2006.01)
*B60W 10/08* (2006.01)
*B60W 30/09* (2012.01)
*B60W 60/00* (2020.01)

(52) U.S. Cl.
CPC ............ *B60W 20/15* (2016.01); *B60W 10/06* (2013.01); *B60W 10/08* (2013.01); *B60W 30/09* (2013.01); *B60W 60/001* (2020.02); *B60W 2510/207* (2013.01); *B60W 2520/105* (2013.01); *B60W 2552/30* (2020.02); *B60W 2710/0666* (2013.01); *B60W 2710/083* (2013.01)

(58) Field of Classification Search
CPC ...... B60W 20/15; B60W 10/06; B60W 10/08; B60W 30/09; B60W 60/001; B60W 2510/207; B60W 2520/105; B60W 2552/30; B60W 2710/0666; B60W 2710/083; B60W 2552/15
See application file for complete search history.

(56) References Cited

U.S. PATENT DOCUMENTS

2024/0059304 A1*  2/2024  Nakamura ............... G08G 1/00

FOREIGN PATENT DOCUMENTS

DE    102022111723 A1 * 11/2023
WO    WO-2024240225 A1 * 11/2024

* cited by examiner

*Primary Examiner* — Brian P Sweeney
(74) *Attorney, Agent, or Firm* — Jeremy J. Klobucar

(57) ABSTRACT

A method for controlling driveline torque on an electrified powertrain based on obstacle detection is provided. The electrified powertrain includes a first eMotor, a second eMotor and an internal combustion engine (ICE). An obstacle is detected proximate to the vehicle. A proximity signal is communicated to a first torque module that determines a first torque limit. A road surface is detected. A traction limit signal is communicated to a second torque module that determines a second torque limit. A road curvature is detected. A curvature signal is communicated to a third torque module that determines a third torque limit. A safety tolerance is determined based on the first, second and third torque limit. A first torque request is communicated to the ICE. A second torque request is communicated to the first eMotor. A third torque request is communicated to the second eMotor.

20 Claims, 4 Drawing Sheets

METHOD FOR CONTROLLING VEHICLE POWERTRAIN BASED ON OBSTACLE DETECTION

FIELD

The present application generally to hybrid electrified vehicles and, more particularly, to a control strategy that actively controls torque tolerances based on obstacle detection.

BACKGROUND

An electrified vehicle (hybrid electric, plug-in hybrid electric, range-extended electric, battery electric, etc.) includes at least one battery system and at least one electronic drive module having an electric motor and associated electric drive gearbox assembly. Typically, the electrified vehicle would include a high voltage battery system and a low voltage (e.g., 12 volt) battery system. In such a configuration, the high voltage battery system is utilized to power at least one electric motor configured on the vehicle and to recharge the low voltage battery system via a direct current to direct current (DC-DC) convertor. Hybrid electric vehicles also include an internal combustion engine (ICE) that provides another torque input for delivering to vehicle drive wheels. A controller determines which one or combination of the electric motors and ICE is used to deliver torque to the vehicle drive wheels based on operating conditions.

Many electrified vehicles include obstacle detection sensors that send signals to a vehicle controller indicative of a sensed obstacle. Existing torque control strategies rely on calibrating the system torque diagnostic to protect people during worst-case events. In examples, a worst-case event can include detection of a pedestrian nearby in a parking lot. Such use cases make up a small portion of the actual driving experience. In this regard, such control strategies can be more sensitive than what is necessary for all driving conditions. Accordingly, while such control strategies do work well for their intended purpose, there is a desire for improvement in the relevant art.

SUMMARY

According to one example aspect of the invention a method for controlling driveline torque on an electrified powertrain of a vehicle based on obstacle detection is provided. The electrified powertrain includes a first eMotor, a second eMotor and an internal combustion engine (ICE). An obstacle is detected proximate to the vehicle. A proximity signal is communicated to a first torque module that determines a first torque limit based on the detecting. A road surface is detected. A traction limit signal is communicated to a second torque module that determines a second torque limit based on the detecting. A road curvature is detected. A curvature signal is communicated to a third torque module that determines a third torque limit based on the detecting. A safety tolerance is determined based on the first, second and third torque limit. A first torque request is communicated based on the safety tolerance to an engine controller that controls torque output of the ICE. A second torque request is communicated based on the safety tolerance to a first eMotor controller that controls torque output of the first eMotor. A third torque request is communicated based on the safety tolerance to a second eMotor controller that controls torque output of the second eMotor.

In some implementations, detecting an obstacle comprises detecting the obstacle with an obstacle detection sensor. Detecting a road surface comprises detecting the road surface with a traction control sensor. Detecting the road curvature comprises detecting the road curvature with a road curvature sensor.

In some implementations, the first torque module determines an excess acceleration allowed before colliding with the detected obstacle and outputs the first torque limit based on the determination. The second torque module determines an excess torque allowed before wheels of the vehicle slip and outputs the second torque limit based on the determination. The third torque module determines an excess torque allowed before there is one of understeer and oversteer of the vehicle and outputs the third torque limit based on the determination.

In some implementations, an engine torque request, a first eMotor torque request and a second eMotor torque request is received at a modeled system torque module. A modeled system torque is determined and communicated to a safety check module. A desired vehicle acceleration is determined. A system torque request is communicated to the safety check module based on the determining. The safety check module communicates the first, second and third torque requests based on the system torque request, the modeled system torque and the safety tolerance. The safety check module communicates the first, second and third torque requests based on the modeled torque not being greater than a sum of the system torque request and the safety tolerance.

In some implementations, detecting the first, second and third torque limits comprises detecting the first, second and third torque limits at an autonomous driving controller (ADC). Communicating the first, second and third torque requests comprises communicating the first, second and third torque limits at an electric vehicle control unit (EVCU).

An electrified powertrain of a vehicle that controls driveline torque based on obstacle detection includes a first eMotor, a second eMotor and an internal combustion engine (ICE). An obstacle detection sensor detects an obstacle proximate to the vehicle and communicates a proximity signal to a first torque module that determines a first torque limit based on the detecting. A road surface sensor detects a road surface and communicates a traction limit signal to a second torque module that determines a second torque limit based on the detecting. A road curvature sensor detects a road curvature and communicates a curvature signal to a third torque module that determines a third torque limit based on the detecting. A minimum torque module determines a safety tolerance based on the first, second and third torque limit. A safety check module communicates (i) a first torque request to an engine controller that controls torque output of the ICE, (ii) a second torque request to a first eMotor controller that controls torque output of the first eMotor; and (iii) a third torque request to a second eMotor controller that controls torque output of the second eMotor based on the safety tolerance.

In additional implementations, the first torque module determines an excess acceleration allowed before colliding with the detected obstacle and outputs the first torque limit based on the determination. The second torque module determines an excess torque allowed before wheels of the vehicle slip and outputs the second torque limit based on the determination. The third torque module determines an excess torque allowed before there is one of understeer and oversteer of the vehicle and outputs the third torque limit based on the determination.

In other implementations, a modeled system torque module receives an engine torque request, a first eMotor torque request and a second eMotor torque request and determines a modeled system torque based on the engine torque request, the first eMotor torque request and the second eMotor torque request. The safety check module communicates the first, second and third torque requests based on a system torque request, the modeled system torque and the safety tolerance. The safety check module communicates the first, second and third torque requests based on the modeled torque not being greater than a sum of the system torque request and the safety tolerance.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

DESCRIPTION

As discussed above, many electrified vehicles include obstacle detection sensors that send signals to a vehicle controller indicative of a sensed obstacle. Existing torque control strategies rely on calibrating the system torque diagnostic to protect people during worst-case events. In examples, a worst-case event can include detection of a pedestrian nearby in a parking lot. Such use cases make up a small portion of the actual driving experience. Current torque diagnostic control strategies are tuned such that the diagnostic will react fast enough such that there is no unreasonable risk of injuring a nearby pedestrian.

Typically, diagnostic tolerances are kept extremely tight during vehicle maneuvers where the vehicle may have no nearby obstacles. This can lead the system prone to false failing a safety diagnostic and triggering a reaction where there was no actual hazard. A loss of propulsion (the reaction to this diagnostic) itself can be a safety concern. In this regard, such control strategies can be more sensitive than what is necessary for all driving conditions.

The instant disclosure provides an autonomous system that, instead of designing for such worst-case scenarios, is more selective in reacting based on the current actual circumstances. The present disclosure derives tolerances based on obstacle detection from the ADC, rather than only defaulting to a worst-case scenario. The system torque diagnostic can detect issues with the sensitivity to both protect people from harm as well as remain as robust as possible. The present system uses information about the current driving scenario (obstacle detection) to derive system torque tolerances rather than basing these tolerances on engineering analyses and having them become "fixed" during the diagnostic's implementation.

In examples, if the vehicle is on a highway and there are no pedestrians, the safety strategy can be adapted to be more relaxed. Further, the control strategy can determine that the tolerances on the torque commands are less important compared to a timing of how fast the safety mechanism or command is applied. In this regard, the safety strategy can be custom tuned to be based on more information about the environment which will help with its robustness.

Figure 1:
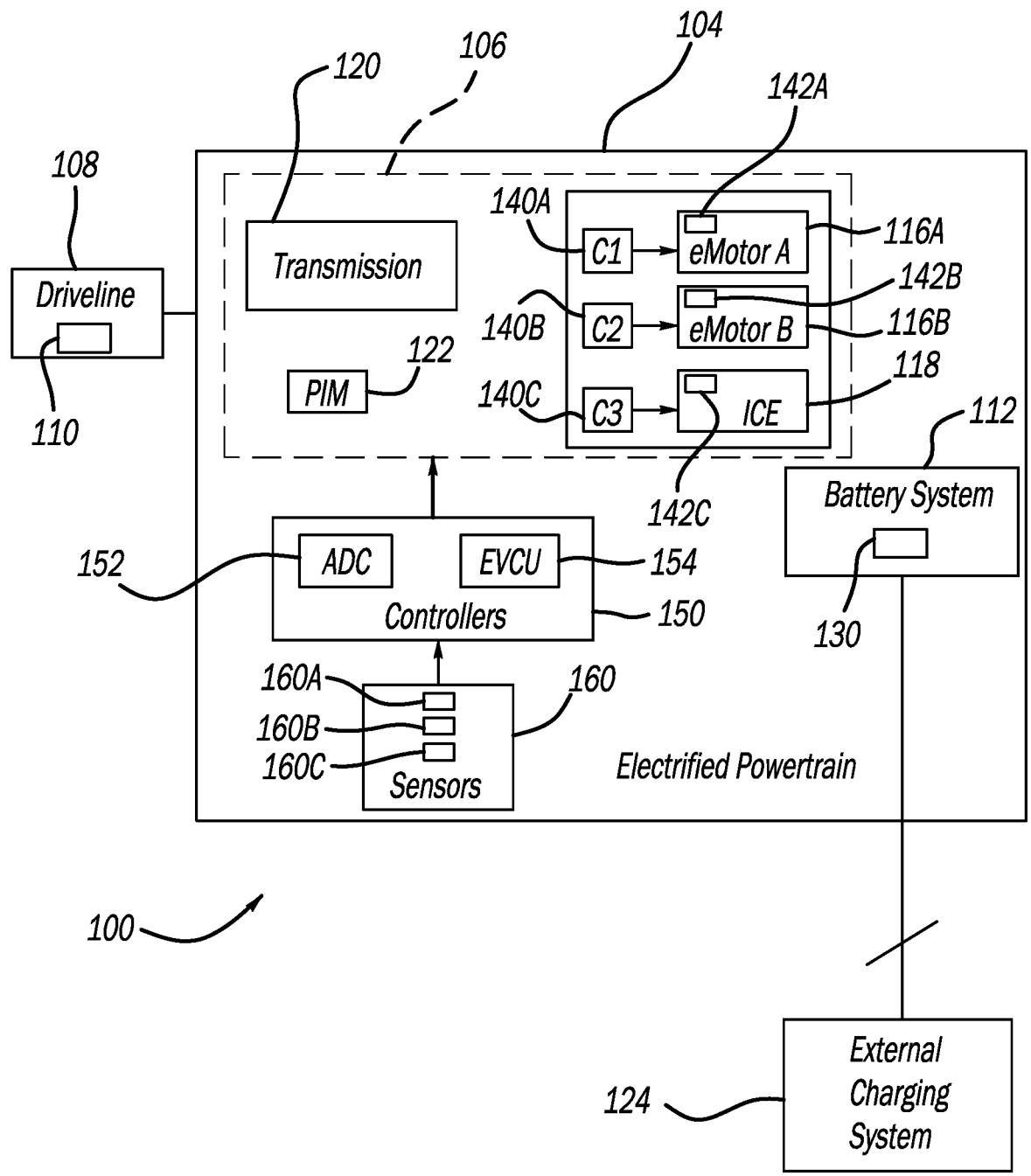
FIG. 1 is a functional block diagram of a hybrid electrified vehicle having first and second electric motors, an internal combustion engine, an autonomous driving controller (ADC) and an electric vehicle control unit (EVCU) according to various principles of the present application.

Referring now to FIG. 1, a functional block diagram of an example electrified vehicle 100 (also referred to herein as "vehicle 100") according to the principles of the present application is illustrated. The vehicle 100 includes an electrified powertrain 104 having an electric drive module (EDM) 106 configured to generate and transfer drive torque to a driveline 108 for vehicle propulsion. The EDM 106 includes drive motors collectively identified at 114. The drive motors 114 can include a first electric drive units or eMotor 116A (e.g., electric traction motor), a second eMotor 116B and an internal combustion engine (ICE) 118. The driveline 108 can include combinations of drive wheels and driven wheels collectively identified at reference 110. The EDM 106 directs torque inputs from one or more of the eMotors 116A, 116B and ICE 118 into an electric drive gearbox assembly or transmission 120. The transmission 120 takes the torque input and delivers it to the driveline 108.

The electric motors 116A, 116B are selectively connectable via a power inverter module (PIM) 124 to a high voltage battery system 112 for powering the electric motors 116A, 116B. The battery system 112 is selectively connectable (e.g., by the driver) to an external charging system 124 (also referred to herein as "charger 124") for charging of the battery system 112. The battery system 112 includes at least one battery pack assembly 130. A first eMotor controller 140A can send a torque signal to an actuator 142A that operates the first eMotor 116A. A second eMotor controller 140B can send a torque signal to an actuator 142B that operates the second eMotor 116B. A third ICE controller 140C can send a torque signal to an actuator 142C that operates the ICE 118.

Controllers 150 can provide various inputs to the EDM 106 related to selectively switching power inputs between the electric motors 116A, 116B and the ICE 118. The controllers 150 according to the present disclosure includes an autonomous driving controller 152 and an electric vehicle control unit (EVCU) 154. The autonomous driving controller 152 can also be referred to as an advanced driver assistance system or ADAS. The EVCU 154 can also be referred to as a vehicle propulsion controller.

The controllers 150 receive various signals from sensors 160 based on vehicle operating conditions and determine a torque request to the EDM 106 based on the signals received. The sensors 160 can include any sensed vehicle information indicative of a driving condition. For example, the sensors 160 can include one or more obstacle detection sensors 160A, a traction control sensor 160B, and a road curvature sensor 160C. As used herein, the traction control sensor 160B and/or the road curvature sensor 160C can include wheels sensors that sense wheel speeds of the wheels 110. It will be appreciated that additional sensors may be used for providing an input to the controllers 150 for further robustness of the system within the scope of the present disclosure.

Figure 2:
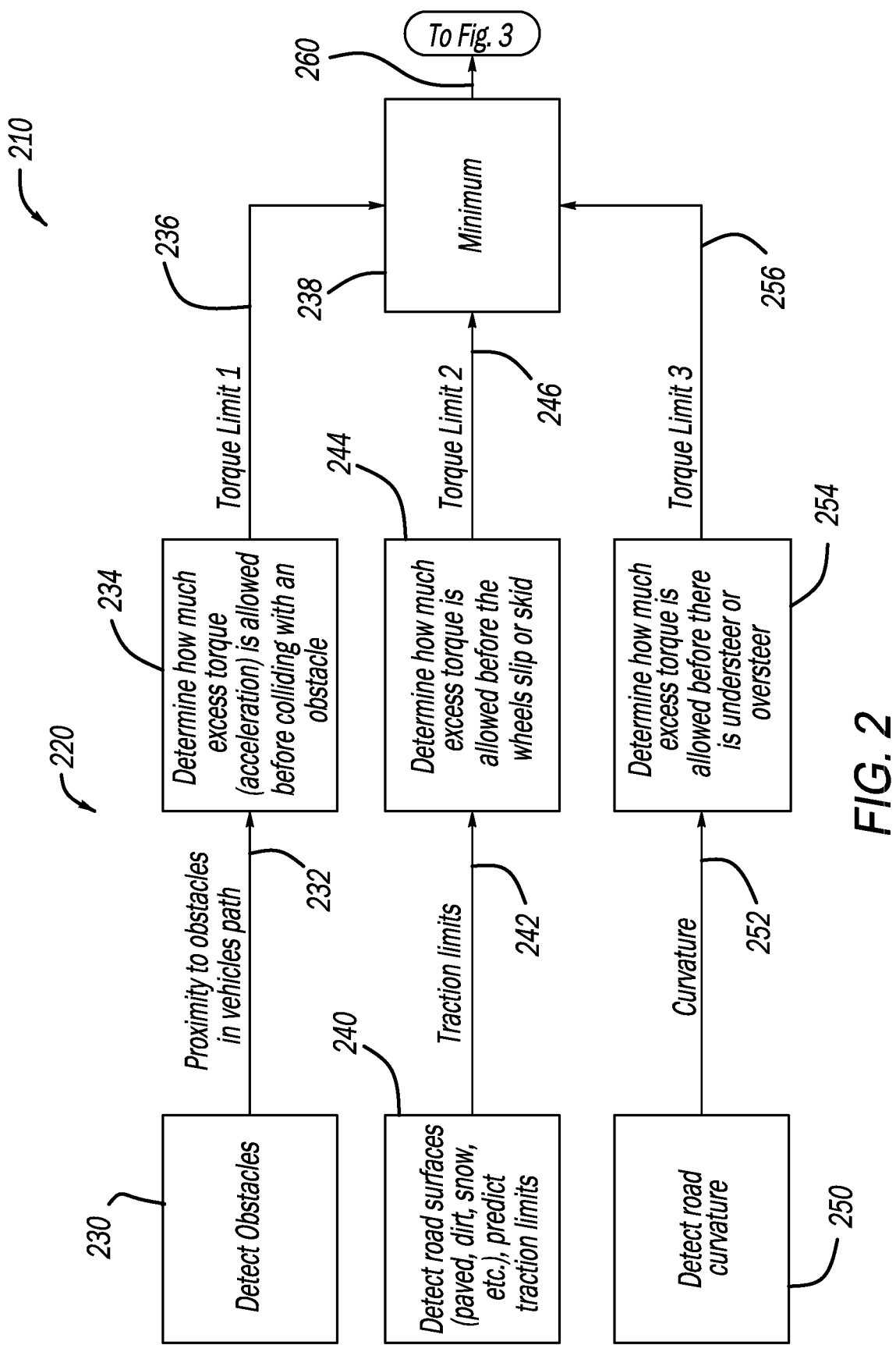
FIGS. 2-4 are a logic flow diagram of a control method for controlling the hybrid electrified vehicle of FIG. 1 according to various principles of the present application.
Figure 3:
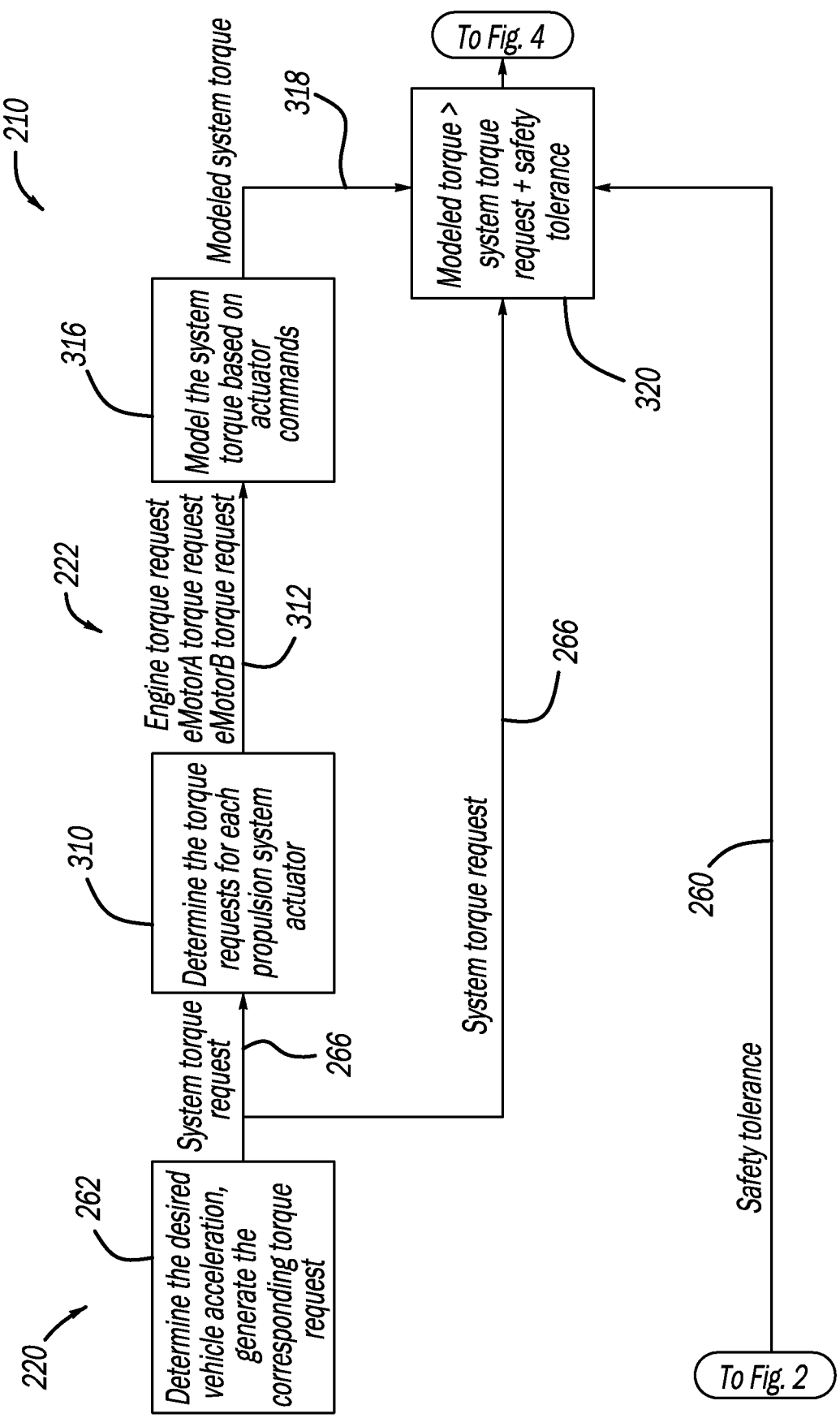
Figure 4:
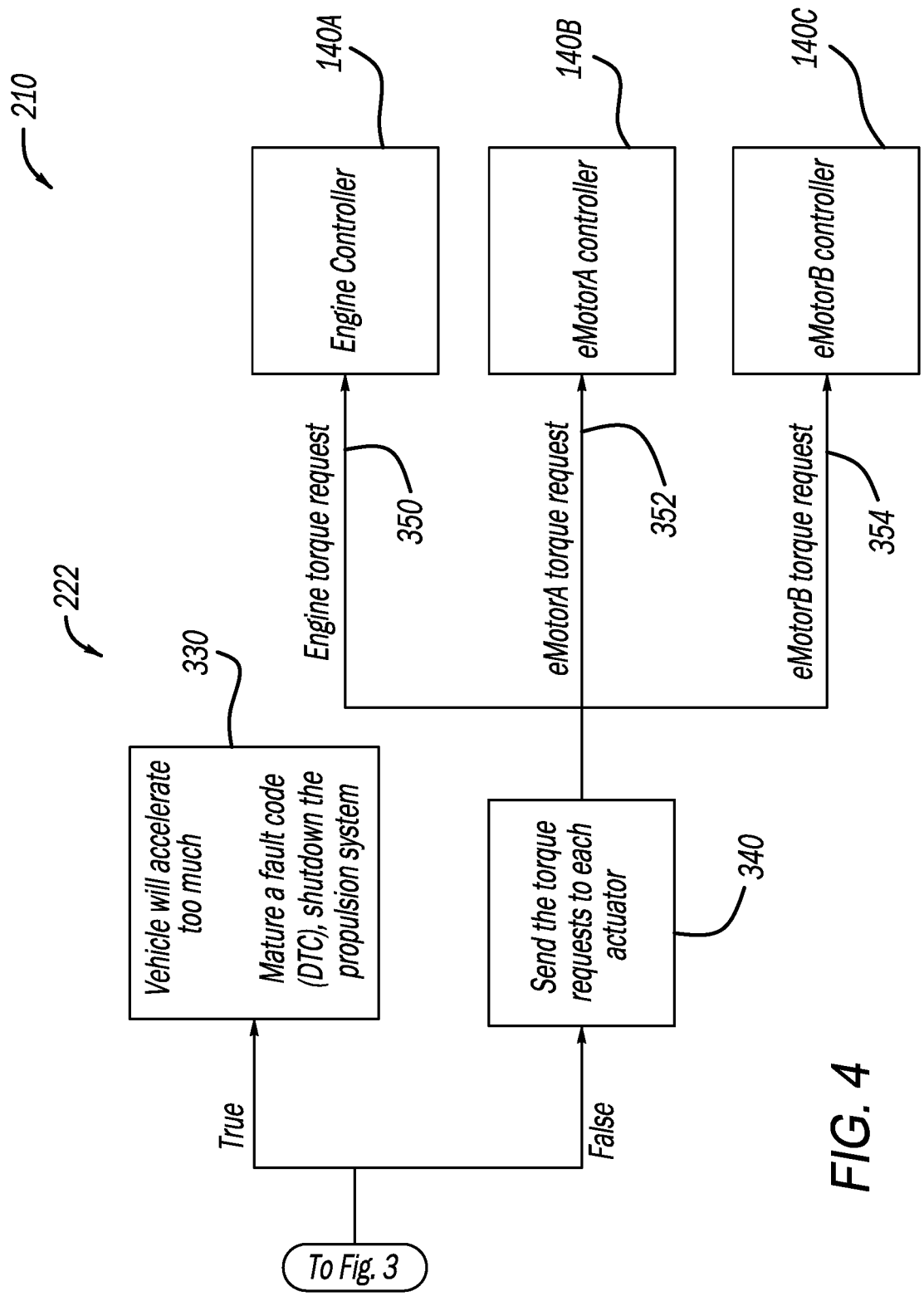

With additional reference now to FIGS. 2-4, an exemplary control strategy for operating the EDM 106 according to the present disclosure is shown and generally identified at reference numeral 210. The control strategy 210 includes first control steps 220 performed by the ADC 152 and second control steps 222 performed by the EVCU 154.

The first control steps 220 performed by the ADC 152 will now be described. At 230 control detects obstacles. In examples, the obstacles can be detected by the obstacle detection sensors 160A. The obstacle detection sensors 160A output a proximity signal 232 to first torque module 234. The first torque module 234 determines how much excess torque (acceleration) is allowed before colliding with the detected obstacle. The first torque module 234 outputs a first torque limit 236 to a minimum torque module 238.

At 240, control detects road surfaces and predicts traction limits. In examples, the road surfaces and traction limits can be determined in part by the traction control sensors 160B. The road surfaces that can be detected include, but are not limited to, snow, dirt, paved and other surfaces. The road surface detection sensors 160B output a traction limit signal 242 to a second torque module 244. The second torque module 244 determines how much excess torque is allowed before the vehicle wheels 110 slip or skid. The second torque module 244 outputs a second torque limit 246 to the minimum torque module 238.

At 250, control detects road curvature. In examples, the road curvature can be determined in part by the road curvature sensor 160C. The road curvature sensor 160C can output a curvature signal 252 to a third torque module 254. The third torque module 252 determines how much excess torque is allowed before there is understeer or oversteer. The third torque module 252 outputs a third torque limit 256 to the minimum torque module 238. The minimum torque module 238 outputs a safety tolerance signal 260 based on the first, second and third torque limits 236, 246 and 256. The first control steps 220 performed by the ADC 152 also include a desired vehicle acceleration module 262 that generates a corresponding torque request signal 266 (FIG. 3).

With additional reference now to FIG. 3, the second control steps 222 performed by the EVCU 150 will be further described. The system torque request signal 266 generated from the vehicle acceleration module 262 is received by a torque request module 310. The torque request module 310 determines torque requests for each propulsion system actuator. In examples, the torque request module 310 determines a torque request for the first eMotor 116A, the second eMotor 116B and the ICE 118. The torque request module 310 outputs torque request signals 312 based on the determination to a modeled system torque module 316. The modeled system torque module 316 models the system torque based on the actuator commands and outputs a modeled system torque signal 318 to a safety check module 320. The system torque request signal 266 is also received by the safety check module 320. The safety check module 320 determines whether the method 210 will cause an unintended acceleration based on analysis of the modeled system torque signal 318, the system torque request signal 266 and the safety tolerance signal 260.

With additional reference to FIG. 4, additional features of the second control steps 222 performed by the EVCU 154 will be described. The safety check module 320 determines whether the modeled torque is greater than the system torque request and the safety tolerance. In examples, the safety check module 320 compares the modeled system torque signal 318 and determines whether it is greater than a sum of the system torque request signal 266 and the safety tolerance signal 260. If the safety check module 320 determines that the modeled system torque signal 318 is greater than the sum of the system torque request signal 266 and the safety tolerance signal 260, control determines that the vehicle 104 will accelerate too much and shuts down the EDM 106 at 330.

If the safety check module 320 determines that the modeled system torque signal 318 is not greater than the sum of the system torque request signal 266 and the safety tolerance signal 260, control sends the torque requests to each actuator 142A, 142B, 142C at 340. In examples, an ICE torque request 350 can be communicated to the ICE controller 140C, a first eMotor request 352 can be communicated to the first eMotor controller 140A and a second eMotor request 354 can be communicated to the second eMotor controller 140B. The ICE controller 140C controls torque output of the ICE 118. The first eMotor controller 140A controls torque output of the first eMotor 116A. The second eMotor controller 140B controls torque output of the second eMotor 116B.

As used herein, the term controller or module refers to an application specific integrated circuit (ASIC), an electronic circuit, a processor (shared, dedicated, or group) and memory that executes one or more software or firmware programs, a combinational logic circuit, and/or other suitable components that provide the described functionality.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present application, its application or uses. Thus, variations that do not depart from the gist of the present application are intended to be within the scope of the present application.

What is claimed is:

1. A method for controlling driveline torque on an electrified powertrain of a vehicle based on obstacle detection, the electrified powertrain including a first eMotor, a second eMotor and an internal combustion engine (ICE), the method comprising:
    detecting an obstacle proximate to the vehicle and communicating a proximity signal to a first torque module that determines a first torque limit based on the detecting;
    detecting a road surface and communicating a traction limit signal to a second torque module that determines a second torque limit based on the detecting;
    detecting a road curvature and communicating a curvature signal to a third torque module that determines a third torque limit based on the detecting;
    determining a safety tolerance based on the first, second and third torque limit;
    communicating, based on the safety tolerance, a first torque request to an engine controller that controls torque output of the ICE;
    communicating, based on the safety tolerance, a second torque request to a first eMotor controller that controls torque output of the first eMotor; and communicating, based on the safety tolerance, a third torque request to a second eMotor controller that controls torque output of the second eMotor.

2. The method of claim 1, wherein the detecting an obstacle comprises detecting the obstacle with an obstacle detection sensor.

3. The method of claim 1, wherein the detecting a road surface comprises detecting the road surface with a traction control sensor.

4. The method of claim 1, wherein the detecting the road curvature comprises detecting the road curvature with a road curvature sensor.

5. The method of claim 1, wherein the first torque module determines an excess acceleration allowed before colliding with the detected obstacle and outputs the first torque limit based on the determination.

6. The method of claim 1, wherein the second torque module determines an excess torque allowed before wheels of the vehicle slip and outputs the second torque limit based on the determination.

7. The method of claim 1, wherein the third torque module determines an excess torque allowed before there is one of understeer and oversteer of the vehicle and outputs the third torque limit based on the determination.

8. The method of claim 1, further comprising:
receiving, at a modeled system torque module, an engine torque request, a first eMotor torque request and a second eMotor torque request;
determining a modeled system torque; and
communicating the modeled system torque to a safety check module.

9. The method of claim 8, further comprising:
determining a desired vehicle acceleration; and
communicating a system torque request to the safety check module based on the determining.

10. The method of claim 9, wherein the safety check module communicates the first, second and third torque requests based on the system torque request, the modeled system torque and the safety tolerance.

11. The method of claim 10, wherein the safety check module communicates the first, second and third torque requests based on the modeled torque not being greater than a sum of the system torque request and the safety tolerance.

12. The method of claim 1, wherein detecting the first, second and third torque limits comprises detecting the first, second and third torque limits at an autonomous driving controller (ADC).

13. The method of claim 1, wherein communicating the first, second and third torque requests comprises communicating the first, second and third torque limits at an electric vehicle control unit (EVCU).

14. An electrified powertrain of a vehicle that controls driveline torque based on obstacle detection, the electrified powertrain comprising:

a first eMotor, a second eMotor and an internal combustion engine (ICE);
an obstacle detection sensor that detects an obstacle proximate to the vehicle and communicates a proximity signal to a first torque module that determines a first torque limit based on the detecting;
a road surface sensor that detects a road surface and communicates a traction limit signal to a second torque module that determines a second torque limit based on the detecting;
a road curvature sensor that detects a road curvature and communicates a curvature signal to a third torque module that determines a third torque limit based on the detecting;
a minimum torque module that determines a safety tolerance based on the first, second and third torque limit; and
a safety check module that communicates (i) a first torque request to an engine controller that controls torque output of the ICE, (ii) a second torque request to a first eMotor controller that controls torque output of the first eMotor; and (iii) a third torque request to a second eMotor controller that controls torque output of the second eMotor based on the safety tolerance.

15. The electrified powertrain of claim 14, wherein the first torque module determines an excess acceleration allowed before colliding with the detected obstacle and outputs the first torque limit based on the determination.

16. The electrified powertrain of claim 14, wherein the second torque module determines an excess torque allowed before wheels of the vehicle slip and outputs the second torque limit based on the determination.

17. The electrified powertrain of claim 14, wherein the third torque module determines an excess torque allowed before there is one of understeer and oversteer of the vehicle and outputs the third torque limit based on the determination.

18. The electrified powertrain of claim 17, wherein the safety check module communicates the first, second and third torque requests based on a system torque request, the modeled system torque and the safety tolerance.

19. The electrified powertrain of claim 14, further comprising a modeled system torque module that receives an engine torque request, a first eMotor torque request and a second eMotor torque request and determines a modeled system torque based on the engine torque request, the first eMotor torque request and the second eMotor torque request.

20. The electrified powertrain of claim 19, wherein the safety check module communicates the first, second and third torque requests based on the modeled torque not being greater than a sum of the system torque request and the safety tolerance.

* * * * *